(12) United States Patent
Idikurt et al.

(10) Patent No.: US 10,608,287 B2
(45) Date of Patent: Mar. 31, 2020

(54) METHOD FOR PRODUCING ENERGY STORAGE CELLS, ENERGY STORAGE CELLS, BATTERY MODULE, AND MOTOR VEHICLE

(71) Applicant: Bayerische Motoren Werke Aktiengesellschaft, Munich (DE)

(72) Inventors: Tuncay Idikurt, Munich (DE); Azad Darbandi, Unterfoehring (DE); Jochen Gerschler, Aschheim (DE); Olav Finkenwirth, Munich (DE); Matthias Frahm, Munich (DE); Daniel Scherer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/976,085

(22) Filed: May 10, 2018

(65) Prior Publication Data
US 2018/0261887 A1    Sep. 13, 2018

Related U.S. Application Data

(63) Continuation of application No. PCT/EP2016/075025, filed on Oct. 19, 2016.

(30) Foreign Application Priority Data

Nov. 11, 2015    (DE) .......................... 10 2015 222 201

(51) Int. Cl.
*H01M 10/0587* (2010.01)
*H01M 10/0525* (2010.01)
(Continued)

(52) U.S. Cl.
CPC ....... *H01M 10/0587* (2013.01); *H01M 2/024* (2013.01); *H01M 2/0237* (2013.01);
(Continued)

(58) Field of Classification Search
None
See application file for complete search history.

(56) References Cited

U.S. PATENT DOCUMENTS

| 6,120,936 A * | 9/2000 | Young ................... B22F 9/023 419/3 |
| 2008/0090143 A1 | 4/2008 | Yageta et al. |

(Continued)

FOREIGN PATENT DOCUMENTS

| CN | 102810649 A | 12/2012 |
| DE | 101 43 227 A1 | 3/2003 |

(Continued)

OTHER PUBLICATIONS

PCT/EP2016/075025, International Search Report dated Dec. 22, 2016 (Three (3) pages).

*Primary Examiner* — Amanda J Barrow
(74) *Attorney, Agent, or Firm* — Crowell & Moring LLP

(57) ABSTRACT

A method for producing an energy storage cell, in particular a lithium-ion cell, whose housing is elastically deformable include introducing at least one electrode coil or electrode stack, having at least two electrodes and at least one separator arranged between the electrodes, into a housing. The method also includes introducing an electrolyte into the housing, and filling the housing with gas and generating an excess pressure in the housing, by which at least one housing wall of the housing is curved outward. The housing is sealed in a gas-tight manner such that the excess pressure in the housing and the curvature of the at least one housing wall are maintained, and such that the housing is elastically deformable in a direction perpendicular to the at least one curved housing wall.

8 Claims, 2 Drawing Sheets

(51) Int. Cl.
*H01M 10/058* (2010.01)
*H01M 2/02* (2006.01)
*H01M 10/04* (2006.01)
*H01M 10/0585* (2010.01)

(52) U.S. Cl.
CPC ..... *H01M 10/0481* (2013.01); *H01M 10/058* (2013.01); *H01M 10/0525* (2013.01); *H01M 10/0585* (2013.01); H01M 2220/20 (2013.01); Y02E 60/122 (2013.01); Y02P 70/54 (2015.11)

(56) References Cited

U.S. PATENT DOCUMENTS

| | | | |
|---|---|---|---|
| 2011/0177377 A1 | 7/2011 | Dube | |
| 2012/0208054 A1* | 8/2012 | Shirasawa | H01M 2/1077 429/90 |
| 2014/0170468 A1* | 6/2014 | Sasaoka | H01M 2/1061 429/153 |
| 2014/0377633 A1* | 12/2014 | Kong | H01M 10/0468 429/156 |
| 2016/0176615 A1* | 6/2016 | Harada | B65D 83/0055 222/95 |
| 2018/0277824 A1* | 9/2018 | Li | H01M 2/08 |

FOREIGN PATENT DOCUMENTS

| | | | |
|---|---|---|---|
| DE | 10 2013 202 288 A1 | 8/2014 | |
| DE | 10 2013 113 799 A1 | 6/2015 | |
| JP | 10-214638 * | 8/1998 | ........... H01M 10/38 |

* cited by examiner

METHOD FOR PRODUCING ENERGY STORAGE CELLS, ENERGY STORAGE CELLS, BATTERY MODULE, AND MOTOR VEHICLE

CROSS REFERENCE TO RELATED APPLICATIONS

This application is a continuation of PCT International Application No. PCT/EP2016/075025, filed Oct. 19, 2016, which claims priority under 35 U.S.C. § 119 from German Patent Application No. 10 2015 222 201.2, filed Nov. 11, 2015, the entire disclosures of which are herein expressly incorporated by reference.

BACKGROUND AND SUMMARY OF THE INVENTION

The invention relates to a method for producing energy storage cells, especially lithium ion cells, energy storage cells, a battery module with such energy storage cells, and a motor vehicle with such a battery module.

Batteries for storage of electric energy play a central role in the field of so-called electromobility both in vehicles with pure electric drive and in vehicles with hybrid drive. Usually one employs here high-voltage battery modules having many individual interconnected battery cells. The battery cells may be, for example, lithium, lithium ion, lithium polymer, lithium ion polymer, lithium sulfur or lithium air cells.

In the production of battery modules, the cells assembled into a cell pack are pressed together in a displacement-controlled manner. It may happen that, even if the specified cell thickness is maintained, a large variance may occur for the pressing forces, which may have a negative impact on the lifetime of the cells or the battery module.

The problem which the present invention proposes to solve is to indicate methods for producing energy storage cells, energy storage cells, a battery module, and a motor vehicle which are improved in terms of production and/or lifetime.

A method for producing an energy storage cell, especially a lithium ion cell, according to a first aspect of the invention has the following steps: introducing at least one electrode coil or electrode stack, having at least two electrodes and at least one separator arranged between the electrodes, into a housing; introducing an electrolyte into the housing; filling the housing with gas and generating an excess pressure in the housing, by which at least one housing wall of the housing is curved outward; and sealing the housing in a gas-tight manner, so that the excess pressure in the housing and the curvature of the at least one housing wall are maintained, so that the housing is elastically deformable in a direction perpendicular to the at least one curved housing wall.

A method for producing an energy storage cell, especially a lithium ion cell, according to a second aspect of the invention has the following steps: arranging at least one elastic element on an electrode coil or electrode stack having at least two electrodes, and introducing the electrode coil or electrode stack together with the at least one elastic element into a housing so that the at least one elastic element lies between the electrode coil or electrode stack and at least one housing wall of the housing, so that the housing is elastically deformable in a direction perpendicular to the at least one housing wall.

A method for producing a battery module has the following steps: producing two or more energy storage cells according to the first or second aspect of the invention; arranging the energy storage cells in a row or stacking them, especially in a direction perpendicular to the at least one housing wall; and compressing the row-arranged or stacked energy storage cells in a direction perpendicular to the at least one housing wall.

An energy storage cell according to the first aspect of the invention comprises: at least one electrode coil or electrode stack, having at least two electrodes and at least one separator arranged between the electrodes, and a housing, which surrounds the at least one electrode coil or electrode stack and in which an excess pressure prevails, by which at least one housing wall of the housing is curved outward, so that the housing is elastically deformable in a direction perpendicular to the at least one curved housing wall.

An energy storage cell according to the second aspect of the invention comprises: at least one electrode coil or electrode stack, having at least two electrodes and at least one separator arranged between the electrodes; at least one elastic element, as well as a housing, which surrounds the at least one electrode coil or electrode stack and the at least one elastic element arranged between the electrode coil or electrode stack and at least one housing wall of the housing, so that the housing is elastically deformable in a direction perpendicular to the at least one housing wall.

A battery module according to the invention comprises at least two interconnected energy storage cells according to the first and/or second aspect of the invention.

A motor vehicle according to the invention comprises an electric drive or a hybrid drive as well as a battery module according to the invention.

A motor vehicle in the sense of the present invention is preferably a land vehicle not permanently track-guided, especially a streetcar, such as a passenger car, a truck, a bus or a motorcycle, comprising in particular a hybrid or electric drive.

The invention is based on the notion of designing the energy storage cells to be elastic, especially resilient, in that the housing of the respective cell bulges outward by generating and maintaining an excess pressure inside the cell and/or at least one elastic element is provided between electrode coil or stack and housing wall. By selecting the gas pressure inside the cell or selecting the material and/or thickness of the elastic element, a specific reproducible spring characteristic can be adjusted for the elastic behavior of the respective cell.

Owing to the elastic, and especially resilient design, the cells exhibit a reproducible elastic spring behavior when the cell pack is compressed during the fabrication of the module. In this way, the relationship between geometry, especially thickness of the cells, and force behavior, especially compressing forces, can be taken into account when compressing the pack of cells. By monitoring or selecting the compressing forces during the fabrication of the module, the forces acting on the individual cells can be specifically adjusted, so that predetermined maximum forces can be reliably maintained, having a positive impact on the lifetime of the cells. In this way, the large variance for the forces occurring in the cell pack during the compression which occurs with conventional, non-elastically deformable cells can be reduced or even eliminated, so that a stable production process of modules with defined compressing forces is achieved. This also extends the lifetime of the cells or battery modules.

On the whole, this improves the energy storage cells and battery modules with such energy storage cells in terms of production and lifetime.

In one preferred embodiment of the method according to the first aspect of the invention, before the filling of the housing with gas, a gas initially present in the housing, especially air, is removed. In this way, a defined compressibility of the gas present in the housing can be assured and the required quantity of gas used to achieve the desired pressure in the interior of the housing can be clearly established. Furthermore, unwanted chemical reactions of the gas with the electrode coil or electrode stack or the housing itself can be prevented, such as might limit the lifetime of the cells.

In particular, it is advantageous when the housing is filled with an inert gas, for example nitrogen or carbon dioxide, in order to significantly reduce and/or slow down the likelihood of a reaction of the gas with the electrode coil or electrode stack or the housing itself.

In particular, it is advantageous when the inert gas used is a noble gas, for example helium, neon or argon. Their especially low reactivity has an especially advantageous effect on the lifetime of the energy storage cells and battery modules with such energy storage cells.

In another preferred embodiment of the method according to the first aspect of the invention, at least two opposite housing walls of the housing are curved outward by the filling of the housing with gas and the generating of an excess pressure. This preferably symmetrical curvature significantly facilitates the determination of the pressure point during the compression of the cell pack, so that the compressing forces during the compression of the cell pack can be specifically adjusted and/or monitored. Furthermore, a longer spring path per energy storage cell is formed in this way, making possible a more precise compression for the same force exerted.

Preferably in the case of a so-called prismatic cell, having a housing with two opposite large-area housing walls which are joined together by narrow side walls, the opposite large-area housing walls are curved outward, while the narrower side walls of the housing are not curved outward or only slightly curved outward.

In one preferred embodiment of the method according to the second aspect of the invention, the elastic element used is a layer of rubber, foam, or elastomer. Especially preferred here is a chemically inert material, in order to minimize or prevent chemical reactions with the electrode coil or electrode stack, the electrolyte, and/or the housing wall.

In one preferred embodiment of the battery module, the energy storage cells are designed to absorb the forces occurring during the production and/or during the operation of the battery module by virtue of the housing being elastically deformable in a direction perpendicular to the at least one housing wall. This has an advantageous effect on the lifetime of the energy storage cells of the battery module. Furthermore, the avoiding of peak forces on the energy storage cells of the battery module accomplished in this way ensures a reliable function as well as an enhanced operational security, which is of great importance especially for use in motor vehicles.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
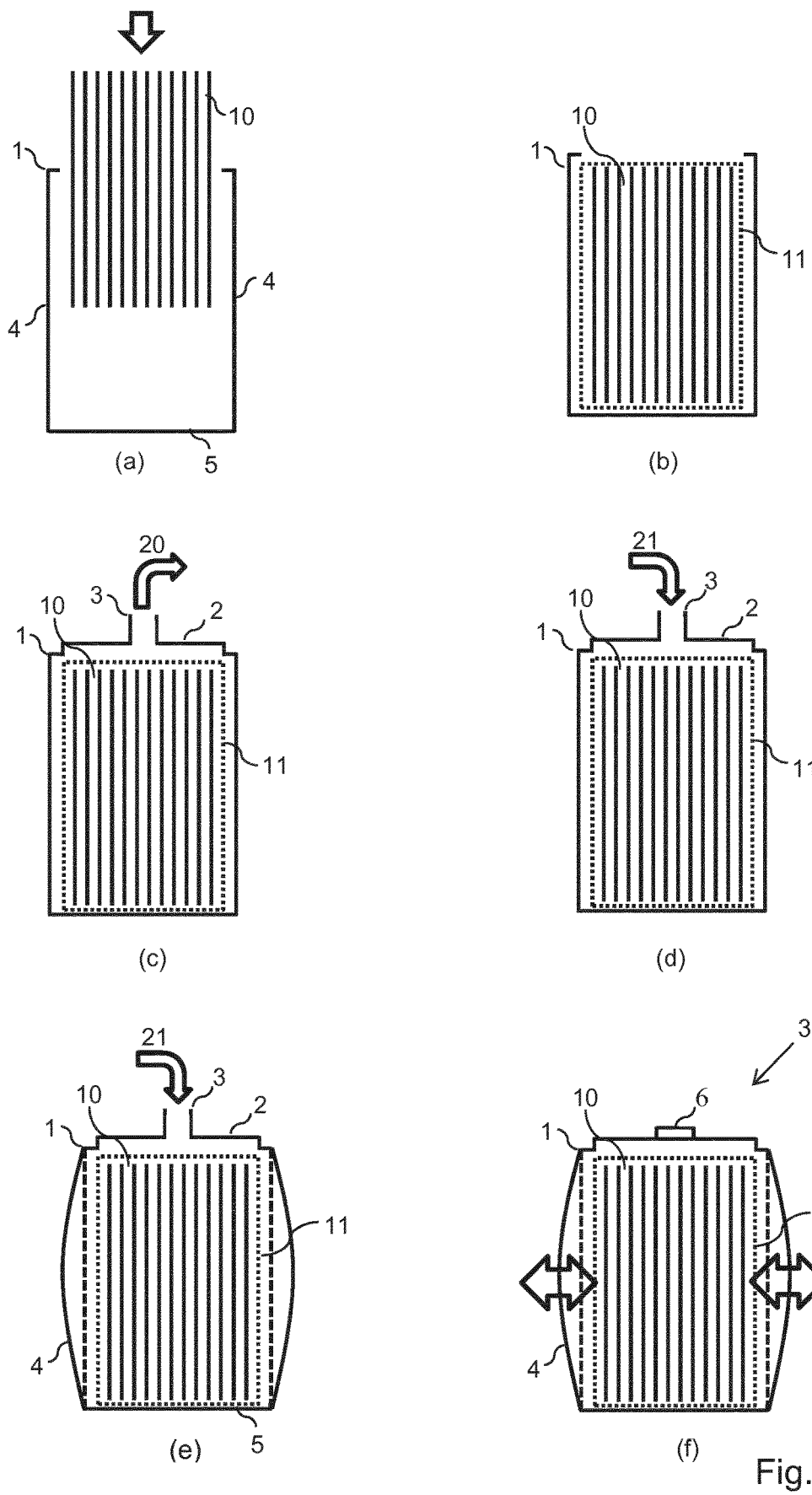
FIG. 1 is examples of steps of a first method for the production of an energy storage cell.

FIG. 1 shows examples of steps of a first method for the production of an energy storage cell. The energy storage cell here is represented each time in cross section. For better clarity, the representation is highly schematized and not true to scale.

In a first step (a), an electrode coil 10 is introduced into a provided housing 1. Preferably, the housing 1 is a so-called prismatic or block-shaped housing with two opposite large-area side walls 4, joined by narrow side walls, of which only the bottom wall 5 can be seen in the chosen representation. The electrode coil 10 consists of at least one or more cathode and anode layers, each cathode layer being separated from the respective anode layer by a separator, which can be formed as a separator layer. This layer or layers are rolled up into a coil. In another embodiment, the electrode coil may also be formed as a so-called electrode stack, in which the layers lie substantially parallel on top of or next to one another.

In a second step (b), an electrolyte 11 is introduced into the housing 1. The electrolyte 11 preferably has a liquid or gel consistency. Preferably, the electrolyte 11 uniformly fills the housing 1 and the electrode coil 10 located therein, especially the regions between the cathode and anode layers of the electrode coil 10.

In a following step (c), the housing 1 is closed with a top cover 2, having an opening 3, for example a connecting piece and/or a valve. In one advantageous embodiment, the top cover 2 is screwed, riveted or welded onto the housing 1 or connected in another manner, so that it closes off the housing 1 in a gas-tight manner. Gas 20 still present in the housing 1, especially air, is removed through the opening 3, in particular, sucked out.

In a further step (d), the housing 1 is filled with a gas 21, especially an inert gas, such as nitrogen or a noble gas, through the opening 3, for example by pumping gas into the interior of the housing 1 with a gas hose connected at one end to a pump (not shown) and at the other end to the opening 3 of the housing 1. The quantity of gas 21 supplied is proportioned such that an excess pressure builds up in the interior of the housing 1 relative to the ambient pressure, which is typically around 1 bar. The gas 21 is chosen such that no chemical reactions or only negligible chemical reactions occur with the housing 1, the electrode coil 10 or the electrolyte 11. In an especially preferred embodiment, the gas 21 is a noble gas, such as helium, neon or argon, which have an especially slight reactivity.

Owing to the excess pressure generated in the housing 1, a curving of at least one of the side walls 4 of the housing 1 occurs. In the example shown here, the two opposite large-area side walls 4 of the housing 1 are curved outward (see (e)). This is accomplished, for example, in that the thickness of the large-area side walls 4 is maintained slight, especially between 0.6 and 1.2 mm, and/or a suitable material is used with a desired flexibility. Preferably, moreover, the narrower side walls of the prismatic housing 1 remain conversely non-deformed. In particular, the bottom 5 and top cover 2 of the housing 1 are substantially non-deformed.

Finally, in step (f) the cell having curved side walls 4 is sealed in a gas-tight manner with a closure 6, such as by applying a sealing compound or by screwing, riveting or welding on the closure. The excess pressure is maintained in the interior of the housing 1 and thus the curvature of the side walls 4 is maintained during this process. Owing to the compressibility of the gas 21 contained in the housing 1, the housing 1 of the energy storage cell 30 now has an elastic, especially a resilient behavior perpendicular to the curved side walls 4, which is indicated in the figure by the two double-head arrows. The side walls 4 of the housing 1 will therefore yield by a spring path of typically between around 0.1 and 2.0 mm under corresponding pressure.

Figure 2:
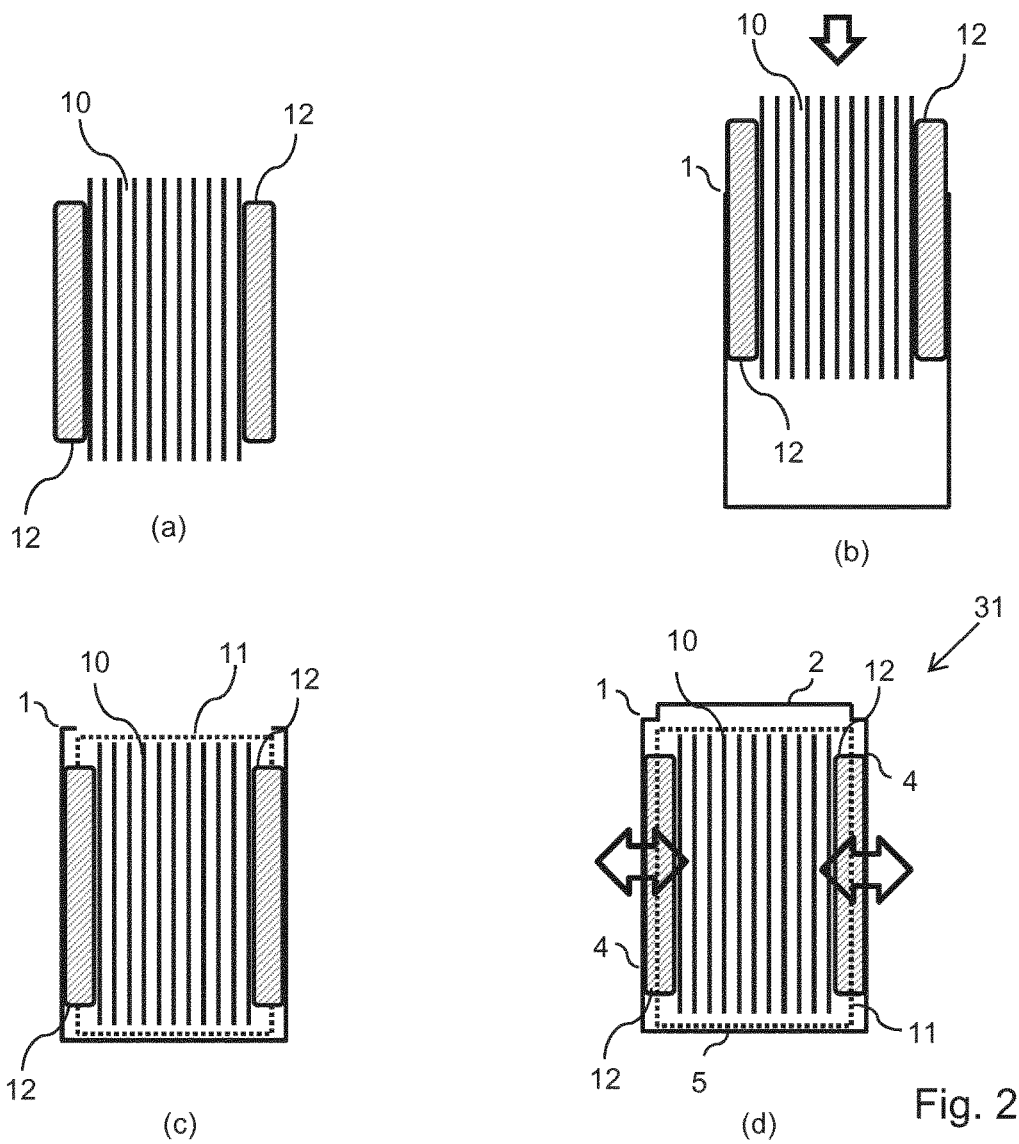
FIG. 2 is examples of steps of a second method for the production of an energy storage cell.

FIG. 2 shows examples of steps of a second method for the production of an energy storage cell. Similar to FIG. 1, the energy storage cell is represented for better clarity only in a side view schematically and not true to scale.

In a first step (a), two elastic elements 12 in the example shown are arranged on an electrode coil 10. The elastic elements 12 preferably exist in the form of a layer, which is made from rubber, foam or an elastomer, and substantially cover the entire respective side surface of the electrode coil 10. Preferably, an elastic element 12 has a thickness between 0.5 and 1.5 mm.

As in FIG. 1, the electrode coil 10 may also be realized as an electrode stack. Furthermore, it is possible to use only one elastic element 12, unlike the example shown here, which covers only one side surface of the electrode coil 10.

In another embodiment of the second method according to the invention, more than two elastic elements 12 may also be used, which are arranged e.g. not only between electrode coil 10 and the side walls 4 of the housing 1, but may also be worked into the electrode coil 10, for example.

In a second step (b), the arrangement of elastic elements 12 and electrode coil 10 is introduced into a housing 1, so that the elastic elements 12 lie between the electrode coil 10 and the opposite side walls 4 of the housing 1. The housing 1 in this case is prismatic or block-shaped, so that it has two large-area, substantially parallel side walls 4. Preferably, the housing walls 4 are in contact with the elastic elements 12, which when fully introduced cover substantially the entire inner surface of the side walls 4 of the housing 1. Preferably, the elastic elements 12 thereby stabilize the position of the electrode coil 10 inside the housing 1.

In a following step (c), an electrolyte 11 is introduced into the housing 1. The electrolyte 11 may have a liquid or gel consistency. Preferably, the electrolyte 11 uniformly fills up the housing, especially the free volume between cathode and anode layers of the electrode coil 10.

In a last step (d), the housing 1 is closed by a top cover 2, for example it is connected by screwing, riveting or welding, or in another way. Owing to the elastic elements 12 adjacent to the side walls 4 of the housing 1, the side walls 4 of the housing 1 are elastically, especially resiliently deformable in a direction perpendicular to the side walls 4 of the housing 1, especially given a slight wall thickness of preferably between 0.6 and 1.2 mm and/or given the choice of an easily deformable material, as indicated in the figure by the two double-head arrows. The side walls 4 can therefore be elastically deformed, the spring path being for example between 0.1 and 2.0 mm.

Figure 3:
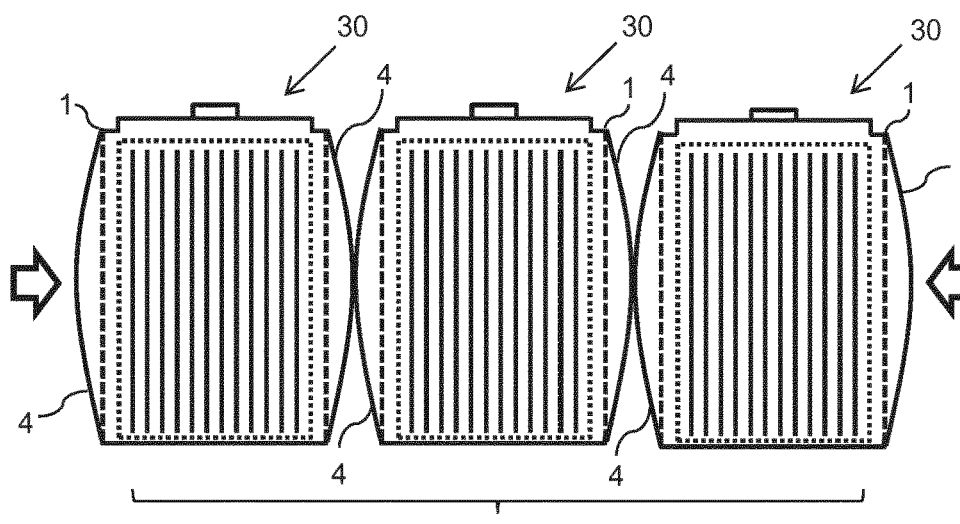
FIG. 3 is an example to illustrate a method for the production of a battery module.

FIG. 3 shows an example of the method for the production of a battery module 40 according to the invention. As in FIGS. 1 and 2, energy storage cells are represented for better clarity in a schematic side view and not true to scale.

In the representation shown, three energy storage cells 30 produced by the first method illustrated in FIG. 1 are stacked or arranged in a row, so that the curved side walls 4 of the housing 1, having an elastic, especially a resilient behavior, are in contact. By pressing them together with a force acting substantially perpendicular against the curved side walls 4 of the housing 1, as indicated by the two outer arrows pointing to the curved side walls 4 of the housing 1, the individual energy storage cells 30 of the battery module 40 are pressed together. Instead of the three energy storage cells 30 in the example shown, only two or also more than three energy storage cells 30 may be assembled and pressed together in this way to form a battery module 40.

The side walls 4 of the housing 1 which are curved according to the invention are in contact in the example shown only at one point, defining the pressure point of the force. Thus, the force distribution is homogeneous over the battery module 40, thereby avoiding local peak forces.

Instead of the energy storage cells 30 shown, which were produced by the first method, one may also use energy storage cells 31 produced by the second method to produce a battery module. In this case, the energy storage cells 31 are stacked or arranged in a row alongside each other, so that the side walls 4 on which the elastic elements 12 are provided inside the housing are in contact with the housing 1. Regarding the benefits achieved in this way, the above remarks in connection with the energy storage cells 30 apply accordingly.

LIST OF REFERENCE SYMBOLS

1 housing
2 top cover
3 opening
4 large-area side wall
5 bottom
6 closure
10 electrode coil or stack
11 electrolyte
12 elastic element
20 gas, especially air
21 gas, especially inert gas or noble gas
30 energy storage cell produced according to the first method
31 energy storage cell produced according to the second method
40 battery module The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing an energy storage cell comprising the acts of:
   introducing at least one electrode coil or electrode stack, having at least two electrodes and at least one separator arranged between the electrodes, into a housing;
   introducing an electrolyte into the housing;
   filling the housing with gas and generating an excess pressure in the housing, by which at least one housing wall of the housing is curved outward; and
   sealing the housing in a gas-tight manner such that the excess pressure in the housing and the curvature of the at least one housing wall are maintained, and such that the housing is elastically deformable in a direction perpendicular to the at least one curved housing wall.

2. The method as claimed in claim 1, wherein prior to said filling the housing with gas, the method comprises removing a gas present in the housing.

3. The method as claimed in claim 1, wherein filling the housing with gas comprises filling the housing with an inert gas.

4. The method as claimed in claim 2, wherein filling the housing with gas comprises filling the housing with an inert gas.

5. The method as claimed in claim 3, wherein the inert gas is a noble gas.

6. The method as claimed in claim 1, wherein at least two opposite housing walls of the housing are curved outward by the filling of the housing with gas and the generating of the excess pressure in the housing.

7. The method as claimed in claim 2, wherein at least two opposite housing walls of the housing are curved outward by the filling of the housing with gas and the generating of the excess pressure in the housing.

8. The method as claimed in claim 3, wherein at least two opposite housing walls of the housing are curved outward by the filling of the housing with gas and the generating of the excess pressure in the housing.

* * * * *